(12) United States Patent
Mihaila et al.

(10) Patent No.: US 10,428,667 B2
(45) Date of Patent: Oct. 1, 2019

(54) MACHINING PROCESS FOR MULTI-VANE NOZZLE

(71) Applicant: SAFRAN AIRCRAFT ENGINES, Paris (FR)

(72) Inventors: Gabriela Mihaila, Suresnes (FR);
Christian Bariaud, Orsay (FR);
Thibault Dalon, Valence en Brie (FR);
Florian Le Merdi, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 82 days.

(21) Appl. No.: 15/485,045

(22) Filed: Apr. 11, 2017

(65) Prior Publication Data
US 2017/0298749 A1    Oct. 19, 2017

(30) Foreign Application Priority Data

Apr. 13, 2016  (FR) ..................................... 16 53271

(51) Int. Cl.
| | | |
|---|---|---|
| *F01D 9/04* | (2006.01) | |
| *G05B 19/401* | (2006.01) | |
| *B23P 15/02* | (2006.01) | |

(52) U.S. Cl.
CPC .............. *F01D 9/041* (2013.01); *B23P 15/02* (2013.01); *G05B 19/401* (2013.01);
(Continued)

(58) Field of Classification Search
CPC ............. F05D 2230/10; F05D 2230/14; F05D 2230/18; F05D 2250/29; G05B 19/401;
(Continued)

(56) References Cited

U.S. PATENT DOCUMENTS

| | | |
|---|---|---|
| 5,293,717 A | 3/1994 | Snyder et al. |
| 2007/0050064 A1 | 3/2007 | Burgess et al. |

(Continued)

FOREIGN PATENT DOCUMENTS

DE       102004008027 A1    9/2005

OTHER PUBLICATIONS

French Search Report and Written Opinion with English Language Translation of Cover Sheet dated Jan. 3, 2017, FR Application No. 1653271.

*Primary Examiner* — Christopher J Besler
(74) *Attorney, Agent, or Firm* — Womble Bond Dickinson (US) LLP

(57) ABSTRACT

The present invention relates to a method for machine finishing the shape of a blank casting for a multi-vane, in particular bi-vane, nozzle of a turbine engine, comprising a first vane and a second vane extending substantially in a radial direction between two walls that are radially inner and radially outer, respectively, the suction face of the first vane defining, together with the pressure face of the trailing edge of the second vane, a cross section of flow (SP), the method comprising measuring, by means of probing, the position of predefined points on said respectively radially inner and radially outer walls on the surface of the vanes and calculating the machining allowances ($\Delta 1$ and $\Delta 2$ respectively) on the first and second vanes with respect to the theoretical profile at said points, wherein the method comprises calculating said cross section of flow (SP) from the height of the duct between said radially inner and radially outer walls, and values of the machining allowances ($\Delta 1$ and $\Delta 2$), a correction of the machining allowance ($\Delta 2$) on one of the vanes being applied when the calculated value of the cross section of flow (SP) is outside predefined tolerances.

6 Claims, 4 Drawing Sheets

(52) U.S. Cl.
CPC ...... *F05D 2230/18* (2013.01); *F05D 2230/21* (2013.01); *F05D 2240/128* (2013.01); *G05B 2219/35128* (2013.01); *G05B 2219/45147* (2013.01)

(58) Field of Classification Search
CPC . G05B 2219/45147; B23P 15/02; F01D 9/041
See application file for complete search history.

(56) References Cited

U.S. PATENT DOCUMENTS

| | | |
|---|---|---|
| 2010/0023157 A1 | 1/2010 | Burgess et al. |
| 2015/0081074 A1* | 3/2015 | Louesdon .......... G05B 19/4099 700/98 |

* cited by examiner

MACHINING PROCESS FOR MULTI-VANE NOZZLE

FIELD OF THE INVENTION

The field of the present invention is that of manufacturing turbine engine components and, more particularly, that of finishing blank components produced by casting; said components are multi-vane members such as bi-vane nozzles intended for equipping the high-pressure stage of a gas turbine engine.

PRIOR ART

The prior art comprises in particular US-A1-2007/050064, US-A-2010/023157, DE-A1-10 2004 008027 and U.S. Pat. No. 5,293,717.

Turbine blades of turbine engines are generally made using what is known as the "lost wax" technique, which makes it possible to directly obtain the required shape for most of the component, without the need to produce a blank component which then has to be machined in order to obtain the final shape thereof. For the record, this method comprises steps such as: manufacturing a core in order to obtain a cooling circuit inside the component; injecting a wax model around the core; assembling the wax models in a cluster; casting a ceramic shell and sintering said shell in order to achieve the ceramic grain binding; dewaxing the shell; pouring metal into the mould; knocking out the shell; cutting the metal cluster into individual components; chemically knocking out the core from the components obtained; finishing said components by high-speed machining HSV and non-destructive testing NDT.

Final machining of the blades comprises operations on the leading edge to remove transferred grains, operations on the trailing edge to remove a trailing edge strip and operations on the platform for its connection to the surface of the vane.

In a turbine engine, a stationary wheel forming a nozzle has the function of directing the gaseous flow into the engine towards the movable wheel. The wheels of the nozzles are formed by single-piece multi-vane, in particular bi-vane, assemblies. The latter, high-pressure bi-vane nozzles, located immediately downstream of the combustion chamber in a gas turbine engine, are complex components to manufacture due in particular to the nature of the high-temperature-resistant materials from which they are made and due to their internal cooling air flow circuit. Said nozzles are manufactured, for example, in two parts by casting, then subsequently assembled to form the bi-vane block. A drawback of this technique is that it leads both to dimensional irregularities in the cross section of flow of gasses and to mechanical resistance of the single-piece block that is not entirely sufficient.

In order to avoid these drawbacks, it is now known to manufacture high-pressure bi-vane nozzles in a single piece.

The applicant has developed a recalculated machining technique that makes it possible to finish cast components while limiting the dimensional irregularities and guaranteeing a good connection of the cast components to the machined parts of the component surface, with no projections, the surfaces joining on the same tangential plane. This type of machining is known as recalculated machining because the path of the machine tool adapts to the geometry of the blank component. This technique is described in EP 2 724 201 in the name of the applicant.

However, for the region located at the neck of the duct formed between two vanes, the final machining process described in the above-mentioned patent does not take into consideration the dimensional features relating to the cross section of flow between two vanes of the blank block produced by casting.

The object of the present invention is a method for machine finishing vanes in the region that defines the gas cross section of flow, i.e. at the neck of the duct. The invention aims to ensure dimensional features of the gas cross section of flow that meet specified tolerances.

DESCRIPTION OF THE INVENTION

This object is achieved by implementing a method for machine finishing the shape of a blank casting for a multi-vane member such as a multi-vane, in particular bi-vane, nozzle of a turbine engine, comprising at least one first vane and one second vane extending substantially in a radial direction between two walls that are radially inner and radially outer, respectively, the suction face of the first vane defining, together with the pressure face of the trailing edge of the second vane, a cross section of flow (SP), the method comprising measuring, by means of probing, the position of predefined points on said respectively radially inner and radially outer walls on the surface of the vanes and calculating the machining allowances ($\Delta 1$ and $\Delta 2$ respectively) on the first and second vanes with respect to the theoretical profile at said points, wherein the method comprises calculating said cross section of flow from the height of the duct between said radially inner and radially outer walls, and values of the machining allowances ($\Delta 1$ and $\Delta 2$), comparing this calculated value with the desired value and correcting the machining allowance ($\Delta 2$) on one of the vanes when the calculated value of the cross section of flow is outside predefined tolerances for the desired value.

The principle of the solution thus makes it possible to carry out the required corrections in the region of the neck of the inter-vane duct, in order to arrive at the desired cross section of flow. The points on the vanes of which the position is measured by probing are selected at predetermined cross sections with respect to a fixed reference point located below the radially inner platform of the nozzle.

More precisely, the method comprises measuring, by probing, the position of predefined points on the suction face of the first vane and points on the pressure face of the trailing edge of the second vane, and points on said respectively radially inner and outer walls, and calculating the cross section of flow from said points.

In accordance with a feature of the invention, the measurement of the position of points on the pressure face of the second vane is made on the basis of the measurement, by probing, of points opposite the suction face of the second vane, the value of the machining allowance ($\Delta 2$) on the pressure face being a function of, preferably equal to, the value of the machining allowance ($\Delta 2'$) on the suction face, ($\Delta 2 = \Delta 2'$).

More particularly, the cross section of flow is calculated as the sum of basic cross sections $\Sigma(Si)$ and a parameter $Cm*Hm$ as a function of a duct height $Hm$ defined between the respectively radially inner and outer walls, $\Sigma(Si)$ being determined over a plurality of transverse sections i distributed over different percentages of the height $Hm$ between the respectively radially inner and outer walls, with $Si = Ci*(Di + \Delta i1 + \Delta i2 + \varepsilon)$ where:

$Ci$ is a predetermined cross section coefficient, the theoretical value of which is a function of the cross section (i), Di is the size of the basic cross section at the sectional radius (i), $\Delta i1$ is the value of the machining allowance on the suction face of the first vane at the sectional radius (i), $\Delta i2$ is the value of the machining allowance on the pressure face of the second vane at the sectional radius (i), the values of the machining allowances $\Delta i1$, $\Delta i2$ being obtained from machining allowances of said points of the pressure face of the second vane and of the suction face of the first vane, the position of which has been measured, and $\varepsilon$ is a correction value to add to $\Delta i2$.

The parameter Cm*Hm is calculated as the product of a coefficient Cm and a height Hm of the duct determined from probed points on the wall: in particular two probed points on the radially inner wall and two points on the radially outer wall of the duct.

Preferably, the value of $\varepsilon$ is obtained by iteration from an initial increment value and from the calculation of the cross section of flow to which said increment value is applied as a positive or a negative value until the calculation of the cross section of flow is within a required tolerance range.

In order to obtain a constant thickness of the trailing edge of the second vane, the value $\Delta i2$ of the machining allowance on the pressure face of the second vane is preferably selected so as to be equal for all basic cross sections of the same size i.

DESCRIPTION OF THE FIGURES

The invention will be better understood, and other objects, details, features and advantages thereof will become clearer in the course of the following detailed explanatory description of an embodiment of the invention given by way of a purely illustrative and non-limiting example, with reference to the appended schematic drawings, in which.

DESCRIPTION OF AN EMBODIMENT OF THE INVENTION

The following description is applicable to a turbine engine member of the multi-vane type, such as a nozzle, and could also apply to another member of the same type.

Figure 1:
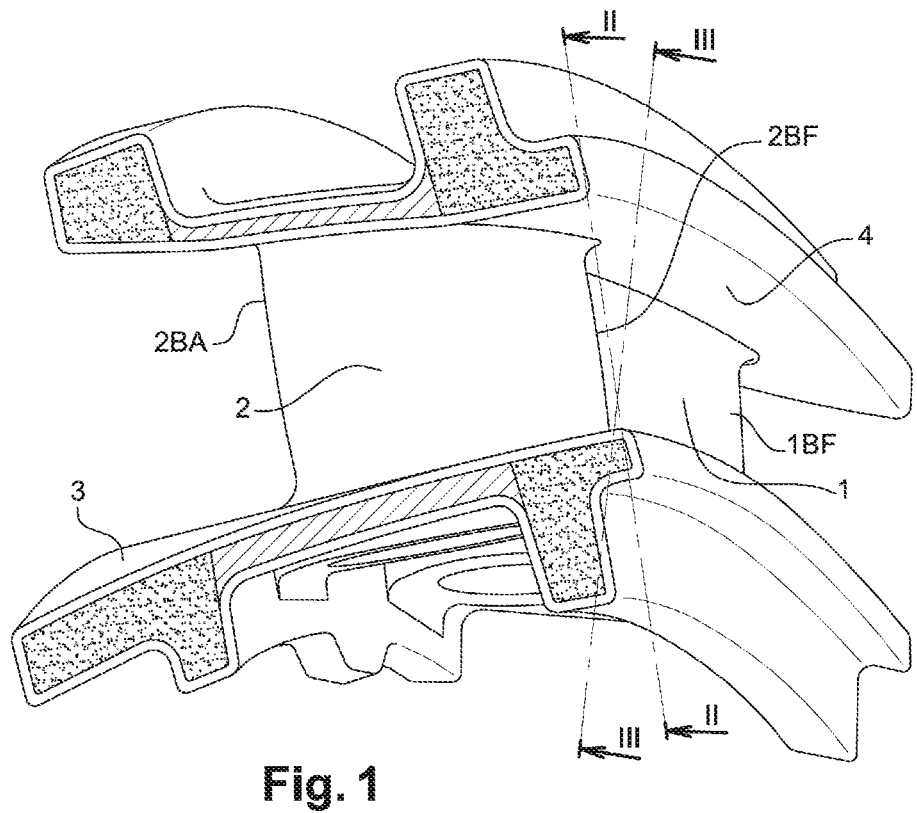
FIG. 1 is a perspective view of a bi-vane high-pressure turbine nozzle.

FIG. 1 is a perspective view of a high pressure bi-vane turbine nozzle D at the end of "lost wax" casting operations, seen obliquely from its trailing edge side. The bi-vane nozzle corresponds to an annular sector around an axis (not shown in the figure). Said nozzle comprises two vanes 1 and 2 extending substantially radially with respect to said axis and connected by an inner ring sector 3 and an outer ring sector 4. The suction face of the second vane 2 can be seen between the leading edge 2BA and the trailing edge 2BF of said vane. The first vane 1, at the back of the drawing with respect to the vane 2, can only be seen in part, from the side of its trailing edge 1BF. The leading edge of vane 1 is hidden here by the vane 2.

Figure 1A:
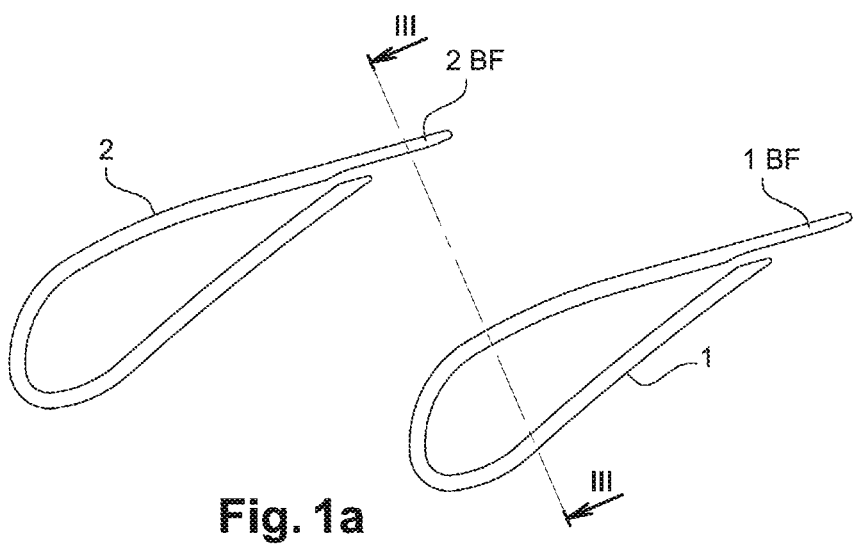
FIG. 1a is a schematic cross section of the nozzle from FIG. 1 in a plane transverse to the vanes, comprising the direction III-III and substantially perpendicular to the direction II-II.

In the case shown, the cross section of flow of the air circulating in the duct delimited between the first vane 1, the second vane 2 and the inner 3 and outer 4 ring sectors, corresponds to the surface area of the profile of said duct in a sectional plane passing through the trailing edge 2BF of the second vane. This sectional plane, comprising a direction II-II substantially radial to and a direction III-III substantially transverse to the profiles of the vanes at the trailing edge 2BF, crosses the first vane 1 far upstream of its trailing edge 1BF, as shown in FIG. 1a. This sectional plane, or plane of the cross section of flow, corresponds to a neck between the two vanes.

As can be seen in FIG. 1a, in the case shown, the first vane 1 is hollow in this sectional plane since this case corresponds to that in the prior art where the vanes are manufactured so as to provide a cooling circuit.

Figure 2:
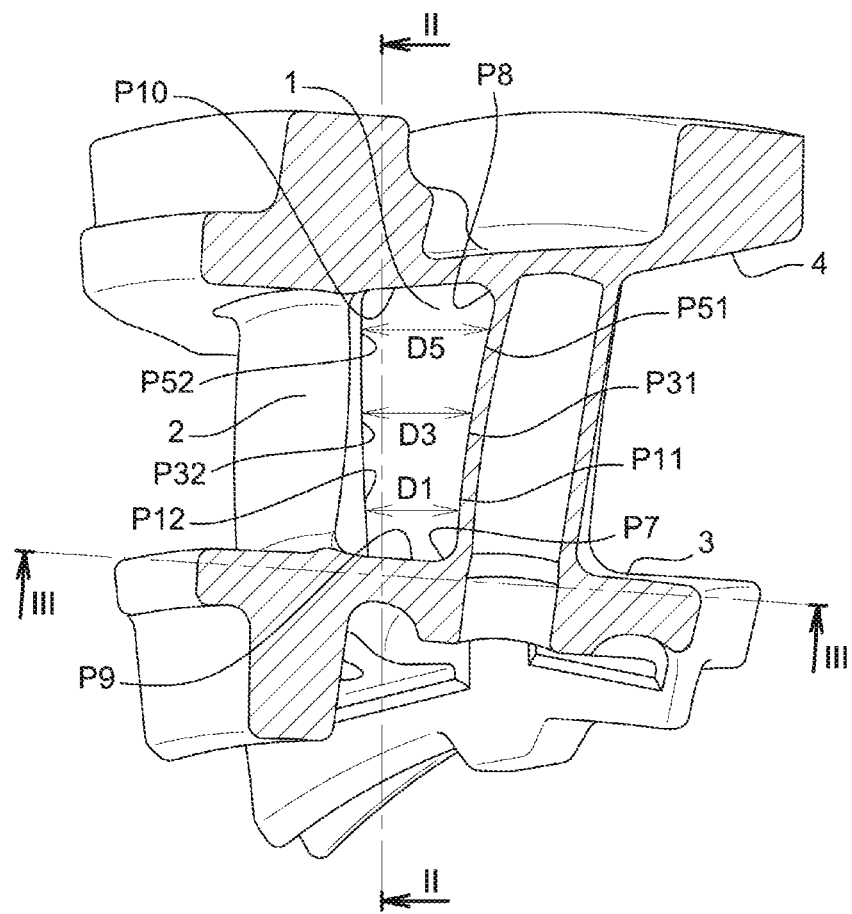
FIG. 2 is a cross section of the nozzle from FIG. 1 in a plane of the cross section of flow, passing through the trailing edge of the vane 2 and comprising the directions II-II and III-III.

FIG. 2 shows the nozzle from FIG. 1 intersected by the plane of the cross section of flow between the two vanes 1 and 2 at the neck of the duct.

With reference to FIG. 2, in an embodiment of the method, this cross section of flow SP is defined in the figure by 10 points in the plane of the cross section of flow:

P12, P32 and P52 are points on the pressure face of the trailing edge 2BF of the second vane 2 of the nozzle at three predetermined radii about the axis with respect to which the annular sector of the nozzle is defined;

P11, P31 and P51 are points on the suction face of the first vane 1 opposite the aforementioned points and at substantially the same predetermined radii;

P7 and P9 are points on the radially inner wall of the duct, on the side of the inner ring sector 3, and P8 and P10 are points on the radially outer wall of the duct, on the side of the outer ring sector 4.

Figure 3:
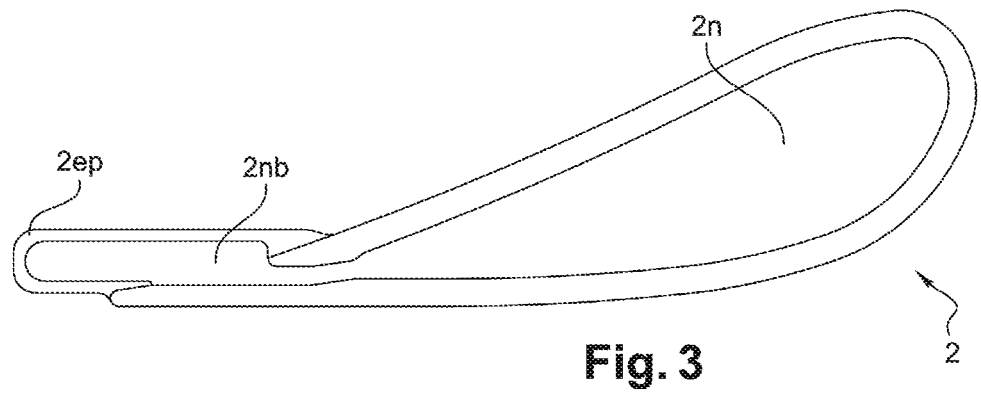
FIG. 3 is a cross section of a vane of the nozzle from FIG. 1 before machining.
Figure 3A:
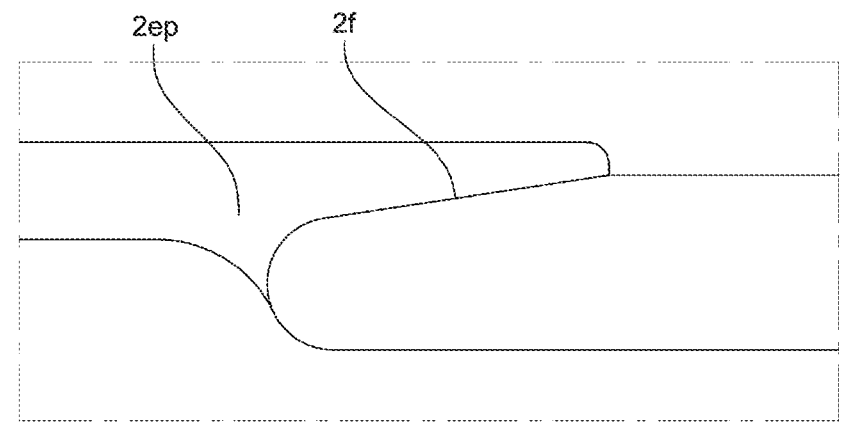
FIG. 3a is an enlarged view of the trailing edge of the vane from FIG. 3.

FIG. 3 is a transverse section through the second vane 2, which section is perpendicular to the longitudinal axis of said second vane at the end of the casting process. Said figure again shows the core 2n having the strip 2nb that crosses the vane wall to form, after the core has been removed, the evacuation vents of the internal cooling circuit of the vane. The trailing edge also has a machining allowance 2ep of the strip 2nb that is to be removed by machining. The aim it to obtain a trailing edge profile corresponding to the outline 2f, which can be seen in the exploded view in FIG. 3a. This profile is obtained such that the cross section of flow SP is the desired cross section of flow, to within the tolerances.

To this end, the following is carried out:

The position of the above-mentioned points is measured using a probing tool that is suitable and known per se, P11, P31, P51 on the suction face of the first vane 1, P7, P8, P9, P10 on the radially outer and inner walls of the duct, P12, P32, P52 on the pressure face of the trailing edge 2BF of the second vane 2.

Figure 4:
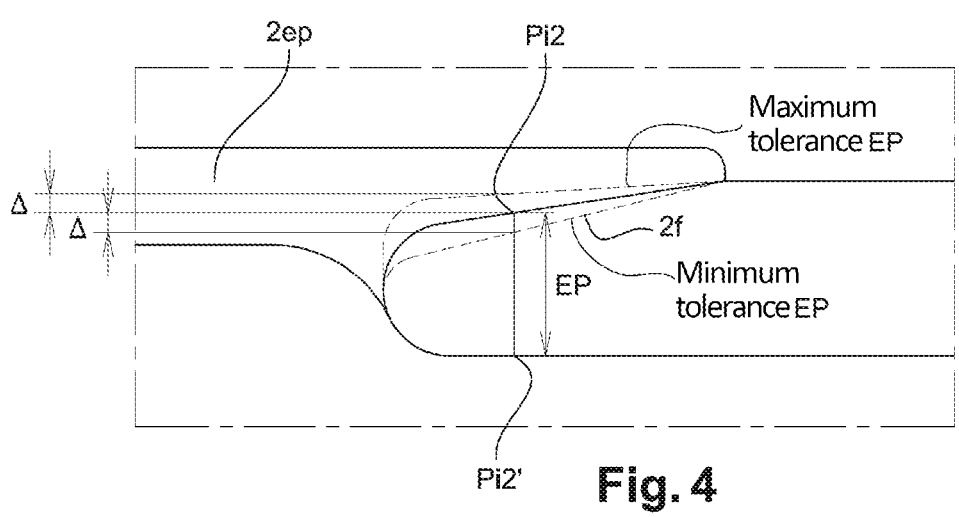
FIG. 4 is an enlarged view of the trailing edge of the vane from FIG. 3, showing the machining tolerances.

For the latter points, P12, P32, P52, the measurement is in fact carried out at points P12', P32' and P52', which are not shown in FIG. 2 and correspond to Pi2' in FIG. 4, where i=1, 3, 5, respectively. Points P12, P32 and P52 on the pressure face are opposite points P12', P32' and P52' and the position thereof is obtained by extrapolation, knowing the thickness EP of the trailing edge (see the distance between Pi2 and Pi2' in FIG. 4). Preferably, this thickness is the same for the three cross sections, i=1, 3, 5. This method is justified by the presence of strips 2nb and the machining allowance 2e before any machining.

Having obtained the coordinates of these points using the method described above, it is possible to determine the machining allowance $\Delta P11$, $\Delta P31$, $\Delta P51$, $\Delta P12'$, $\Delta P32'$ and $\Delta P52'$, $\Delta P7$, $\Delta P8$, $\Delta P9$, $\Delta P10$, denoted generally as A, existing at each of these points with respect to the position of said points in the known theoretical profile, as a result of being cast. The theoretical profile is defined by a three-dimensional theoretical digital model, whereas the actual component, at the end of the casting process, has a profile having a machining allowance at various points.

The theoretical cross section of flow SPt is known. The calculation of SPt can be set out as:

$$SPt = \Sigma Ci^*Di + Cm^*Hm$$

where

Di is the size (in other words the width of the duct) of the cross section at the radius i at each predetermined point Pi2, i=1, 3, 5, and Ci is a predetermined cross section coefficient or integration coefficient, the theoretical value of which is a function of the radius i. As shown in FIG. 2, Di is calculated here as the distance between point Pi2 on the pressure face of the second vane 2 and point Pi1 on the suction face of the first vane 1 located at the same radius i, i=1, 3, 5. Each radius i corresponds to a cylindrical cross section of the nozzle based on a cylinder of radius i around the axis of the ring of which said cylinder is a sector. Reference will therefore be made in the following to cross section i or sectional radius i to reference the corresponding points or coefficients.

Cm and Hm are a coefficient and the height of the duct, respectively. They take into account the shape of the radially outer and inner walls of the duct.

Hm is an average duct height defined between the radially inner and outer walls. Moreover, the sectional radii i correspond to cross sections at various percentages of this average height Hm starting from the radially inner wall.

In practice, the sizes at three radii corresponding substantially to 10%, 50% and 90% of the height of the duct Hm are taken for this calculation.

By applying this formula to values measured by probing, the measurement of the actual cross section SPr is obtained:

$$SPr = \Sigma Ci^*(Di - \Delta i1 + \Delta i2' + \varepsilon) + Cm^*Hm(\Delta P7, \Delta P9, \Delta P8, \Delta P10)$$

where Ci is the same sectional coefficient as in the theoretical calculation

Di is the size of the section at the cross section i $\Delta i1$ is the machining allowance relative to the theoretical profile and is determined by probing the point on the suction face of the first vane 1 at the cross section i.

$\Delta i2'$ is the machining allowance with respect to the theoretical profile and is determined by probing the point on the suction face of the second vane 2 at the cross section i. This value is considered to be equal to $\Delta i2$ which is the machining allowance extrapolated on the pressure face.

In order to determine $\Delta i1$ and, respectively, $\Delta i2$ from the measurements of the machining allowances $\Delta P11$, $\Delta P31$, $\Delta P51$, and $\Delta P12$, $\Delta P32$, $\Delta P52$, made by probing, the method for calculating the cross section of flow has been shown for three sectional radii i corresponding to three radii i where the probing measurements are carried out, but it is obvious that different numbers of points and sectional radii can be used.

In particular, if the number of cross sections does not correspond to the number of probing points, it is possible, in order to use the formula for calculating the cross section of flow, to use interpolations, for example those used in the recalculated machining, in order to use values obtained at the points measured by probing.

Cm*Hm ($\Delta P7$, $\Delta P9$, $\Delta P8$, $\Delta P10$) is a value of the product of the coefficients Cm and Hm, taking into account the shape of the radially outer and inner walls of the duct and corrected taking into account the machining allowances measured by probing at points P7, P8, P9, P10. This corrected value is then no longer modified in the corrections of the cross section of flow SPr.

This value SPr is compared with the theoretical values SPt. If said value SPr is outside the tolerances, a correction $\varepsilon$ is introduced, for example having the value of +0.01 mm or of −0.01 mm depending on whether the value SPr is greater than a predetermined maximum tolerance or less than a predetermined minimum tolerance.

The calculation is repeated N number of times until the calculation gives a SPr value within the predefined tolerance range.

In a last step, the pressure face is machined, preferably by recalculated machining, while applying the correction $N^*\varepsilon$.

For each cross section i, the same value for A is applied: $\Delta 12' = \Delta 32' = \Delta 52'$.

It is preferably also verified that the A obtained makes it possible to remain within maximum and minimum manufacturing tolerances with respect to the thickness EP of the trailing edge, as shown in FIG. 4.

Figure 5:
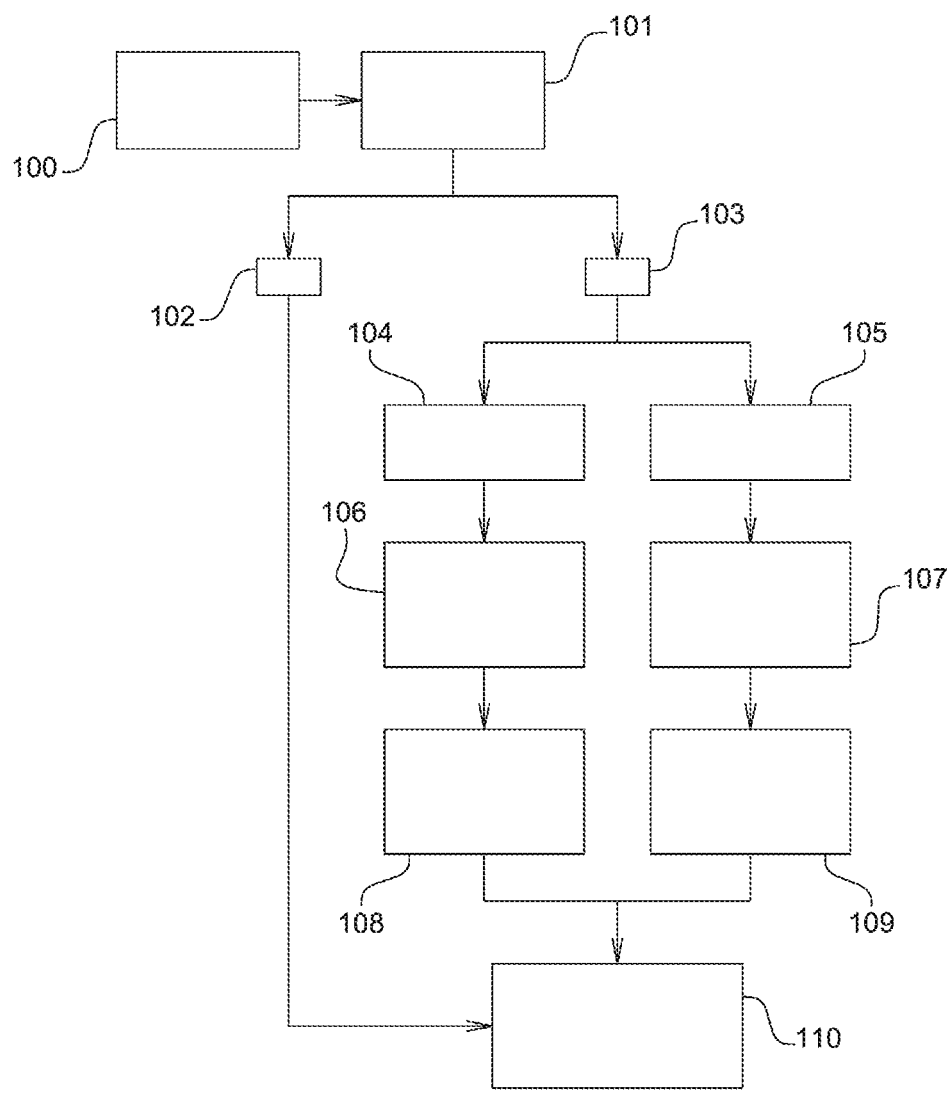
FIG. 5 is the flowchart of the sequences of the method of the invention.

FIG. 5 shows the flowchart of the method.

100: Calculation of the cross section of flow SPr after probing.
101: Verification of whether SPr is within the tolerances.
102: Yes.
103: No.
104: SPr is greater than the maximum tolerance.
105: SPr is less than the minimum tolerance.
106: Calculation of a new SPr from the $\Delta i2$ values to which an increment $-\varepsilon$ has been applied.
107: Calculation of a new SPr from the $\Delta i2$ values to which an increment $+\varepsilon$ has been applied.
108: Iteration of the calculation of SPr from the $\Delta i2$ values to which increments $-\varepsilon$ have been successively applied until SPr is within the tolerance range; number N of iterations limited to 10.
109: Iteration of the calculation of SPr from the $\Delta i2$ values to which increments $+\varepsilon$ have been successively applied until SPr is in within the tolerance range; number N of iterations limited to 10.
110: Machining of the pressure face profile of the trailing edge of the second vane 2 in order to remove a material thickness corresponding to $N^*\varepsilon$.

The invention claimed is:

1. Method for machine finishing a shape of a blank casting for a multi-vane member of a turbine engine, the blank casting comprising at least:
   one first vane and one second vane extending substantially in a radial direction between a radially inner wall and a radially outerwall,
   a suction face of the first vane defining, together with a pressure face and a trailing edge of the second vane, a cross section of flow,
   the method comprising measuring, by means of probing, a position of predefined points on said radially inner and radially outer walls, on the suction face of the first vane and the pressure face of the second face and calculating a machining allowance on the suction face of the first vane and a machining allowance on the pressure face of the second vane with respect to a theoretical profile at said points, the method further includes calculating said cross section of flow from based on a height of a duct between said radially inner and radially outer walls and values of the machining allowances, and finish machining the machining allowance on one of the vanes when the calculated value of the cross section of flow is outside predefined tolerances.

2. Method according to claim 1 further comprising measuring, by probing, the position of predefined points on the suction face of the first vane, points on the pressure face of the trailing edge of the second vane, and points on said respectively radially inner and outer walls, and calculating the distance between the points.

3. Method according to claim 1, a measurement of the position of points on the pressure face of the second vane being made on a basis of the measurement, by probing, of points opposite the suction face of the second vane, a value of the machining allowance on the pressure face being a function of equal to, the value of the machining allowance on the suction face.

4. Method according to claim 1, wherein the cross section of flow is calculated as a sum of basic cross sections $\Sigma(Si)$ and a parameter*Hm that is a function of a duct height Hm defined between the respectively radially inner and outer walls, $\Sigma(Si)$ being determined over a plurality of transverse sections i distributed over different percentages of the height Hm between the respectively radially inner and outer walls, with $Si=Ci*(Di+\Delta i1+\Delta i2+\varepsilon)$ where:

Ci is a predetermined coefficient, a theoretical value of which is a function of a cross section (i), Di is a size of the basic cross section for the cross section (i), $\Delta i1$ is a value of the machining allowance on the suction face of the first vane for the cross section (i), $\Delta i2$ is a value of the machining allowance on the pressure face of the second vane for the cross section (i), the values of the machining allowances $\Delta i1$, $\Delta i2$ being obtained from machining allowances of points of the pressure face of the second vane and of the suction face of the first vane, a position of which has been measured, and $\varepsilon$ being a correction value to add to $\Delta i2$.

5. Method according to claim 4, wherein the value of $\varepsilon$ is obtained by iteration from an initial increment value and from the calculation of the cross section of flow to which said increment value is applied as a positive or a negative value until the calculation of the cross section of flow is within a required tolerance range.

6. Method according to claim 4, wherein the value $\Delta i2$ of a machining allowance on the pressure face of the second vane is selected so as to be equal for all basic cross sections of a same size i.

* * * * *